(12) United States Patent
Kim

(10) Patent No.: US 9,946,805 B2
(45) Date of Patent: Apr. 17, 2018

(54) SYSTEM AND METHOD FOR DISPLAYING SERVICES CAPABLE OF PASTING DOCUMENT STORED ON A CLOUD-BASED CROSS-CLIPBOARD

(75) Inventor: DongWook Kim, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 473 days.

(21) Appl. No.: 13/537,498

(22) Filed: Jun. 29, 2012

(65) Prior Publication Data

US 2013/0013986 A1  Jan. 10, 2013

(30) Foreign Application Priority Data

Jul. 5, 2011  (KR) ........................ 10-2011-0066407

(51) Int. Cl.
*G06F 3/048* (2013.01)
*G06F 17/30* (2006.01)
*G06F 9/54* (2006.01)
*H04L 29/08* (2006.01)

(52) U.S. Cl.
CPC ........ *G06F 17/30899* (2013.01); *H04L 67/02* (2013.01)

(58) Field of Classification Search
CPC .......... G06F 15/00; G06F 21/00; G06F 15/16; G06F 3/048; G06F 3/00; G06F 17/24
USPC ......................................... 715/201, 748, 234
See application file for complete search history.

(56) References Cited

U.S. PATENT DOCUMENTS 6,460,058 B2 * 10/2002 Koppolu et al. .............. 715/738
8,555,187 B2 * 10/2013 Margolin ...................... 715/770
8,782,545 B2 * 7/2014 Creasor .................. G06F 17/24 715/764
8,849,810 B2 * 9/2014 Lucovsky ......... G06F 17/30864 707/728
2007/0136443 A1 * 6/2007 Sah et al. ..................... 709/219

(Continued)

FOREIGN PATENT DOCUMENTS

JP  2005-333399 A  12/2005
JP  2007-279901 A  10/2007

(Continued)

OTHER PUBLICATIONS

Google Cloudboard, published online on Oct. 6, 2009, at https://googlesystem.blogspot.com/2009/10/google-cloudboard.html#gsc.tab=0.*

(Continued)

*Primary Examiner* — Cesar Paula
*Assistant Examiner* — Jian Huang
(74) *Attorney, Agent, or Firm* — Harness, Dickey & Pierce, P.L.C.

(57) ABSTRACT

Provided is a cloud-based document link system and a method that uses a processor to provide a method for providing a service configured to paste a document stored on a cross-clipboard. The cloud-based document link system includes a storage unit configured to store, on a cross-clipboard, at least one first document associated with a first service provided through a first device, an identification unit configured to identify at least one second service linkable with each first document based on whether the at least one second service is configured to paste the at least one first document stored on the cross-clipboard, and a providing unit configured to provide a list of each second service if the cross-clipboard is accessed through a second device.

24 Claims, 15 Drawing Sheets

(56) References Cited

U.S. PATENT DOCUMENTS

| | | |
|---|---|---|
| 2009/0030919 A1* | 1/2009 | Brezina ................ H04M 15/00 |
| 2009/0047000 A1* | 2/2009 | Walikis ............ G06F 17/30053 |
| | | 386/238 |
| 2009/0199093 A1* | 8/2009 | Chakravarty ..... G06F 17/30265 |
| | | 715/273 |
| 2010/0161713 A1* | 6/2010 | Gangadharappa ..... G06Q 10/10 |
| | | 709/203 |
| 2012/0096368 A1* | 4/2012 | McDowell .............. G06F 9/543 |
| | | 715/748 |
| 2012/0109884 A1* | 5/2012 | Goldentouch .......... G06F 17/24 |
| | | 707/608 |
| 2012/0131116 A1* | 5/2012 | Tu ........................ H04L 63/101 |
| | | 709/206 |

FOREIGN PATENT DOCUMENTS

| | | |
|---|---|---|
| JP | 2009-266204 A | 11/2009 |
| JP | 2011-076202 A | 4/2011 |
| JP | 2011-090348 A | 5/2011 |
| WO | WO-2011-002889 A1 | 1/2011 |

OTHER PUBLICATIONS

Japanese Office Action dated Apr. 26, 2016 for corresponding JP Application No. 2012-148726.

* cited by examiner

FIG. 3

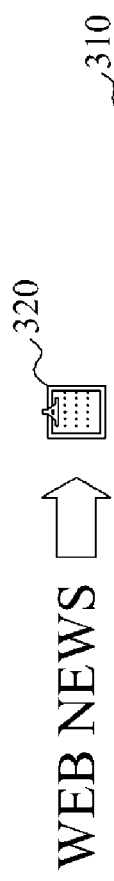

WEB NEWS ⇨ 320
310

[Reporter Sung-ho Cheon, Sports today] The movie "the Fighter" is emerging as a dark horse in the weekend Box office. According to Korean film council, "the Fighter" attracted audience of 32,735 people in 269 screens nationally today. This is three times the record of yesterday, and is showing an upward trend.
The accomplishment is worthy of notice since "the Fighter" is showing a continuous upward trend through word-of-mouth even though the record is low when compared to the existing box office hit such as "World invasion", "Black Swan," etc. Main multiplex was a sellout over the weekend. In fact, "the Fighter" earned one hundred million dollars throughout the world. However, the box office success was unusual. The film was released in the U.S. at four theaters on December 10 of the previous year, and is ranked No. 4 in the Box office after expanding theaters.
On February 28, the film earned 90 million dollars in the U.S. after two months of its release. The film is attending attraction in Korea on whether it continues its success. "The Fighter" was acclaimed for its cinematic quality. In the 83rd Academy Awards held last month, this film won the Academy Awards for an actor in a supporting role and an actress in a supporting role. "The Fighter" is directed by David O. Russell, and Mark Wahlberg and Christian Bale star in the film.

FIG. 6B

📋 ⟹ Character search  /610

/640

David Russell | Director

Born August 20, 1958
Education Amherst College
Debut Director of 'Bingo Inferno' (1987)
Awards Palm Springs International Film Festival (2011)
10$^{th}$ Sundance Film Festival (1994)

Mark Wahlberg | Actor

Born June 5, 1971
Height 175cm
Debut 'The substitute': TV movie 'The substitute' (1993)
Carrier Calvin Klein model (1992~1994)
member of 'Marky Mark and the Funky Bunch' (1991)

📋 ⟹ MUSIC  /610

/650

World Invasion - Battle LA OST
Brian Tyl.. | 2011.03.16
★★★★★ 10/10
▶ Battle Los Angeles Hymn

SYSTEM AND METHOD FOR DISPLAYING SERVICES CAPABLE OF PASTING DOCUMENT STORED ON A CLOUD-BASED CROSS-CLIPBOARD

CROSS-REFERENCE TO RELATED APPLICATION

This application claims priority from and the benefit of Korean Patent Application No. 10-2011-0066407, filed on Jul. 5, 2011, which is hereby incorporated by reference for all purposes as if fully set forth herein.

BACKGROUND

Field

Exemplary embodiments of the present invention relate to a document linking service.

Discussion of the Background

Developments in communications technology may entail various types of services is related to providing a document on the Internet (e.g., web document). A lifecycle for a document may include an expression step of searching for a document, a selection step of selecting a document from a search results list, and a use step of using or viewing a document. The use step may have a characteristic in that use of a document may not be terminated while the expression step and the selection step may be repeatedly performed, and the use of the document may not be continuously performed. More specifically, a search result may be utilized without interruption.

A data type in which a document may be used without interruption may include, without limitation, a prepare and execute type, a keep doing type, and a gather and review type. The prepare and execute type may correspond to a case where an intent to use a document may be expressed in a personal computer (PC) or a similar device, and the document may be used in a destination terminal, which may include a smart television, another PC, a tablet computer, a mobile terminal and the like. The keep doing type may correspond to a case where a document may be used in a PC or a similar device, and use of the document may be expanded in a destination terminal. The gather and review type may correspond to a case where a clue or a hint for a document may be collected in a mobile document, and the document may be directly used in a PC in which utilization of the document may be more convenient.

Internet services may involve a difference in service (e.g., different services, web documents, or capabilities may be provided to different devices), a difference in time (e.g., services may be repeated in separate devices to receive similar or same information on different devices), and a difference in devices while providing a document. More specifically, Internet services may provide different capabilities and operations related to a web document, which may be provided on different devices at different times. For example, without a search process being repeated, music searched for on a PC may not be listened to via a phone or a television (TV). Similarly, without performing a repeated search process, a product searched for in a mobile phone may not be purchased via a PC. Rather, if a search is begun on a first device, a same or similar search may be repeated on a second device before a document found on the first device may be used in the second device.

To handle a difference in devices, the conventional technology may provide an integrated user environment, thereby providing a cloud service to another terminal having the same user environment, in addition to providing the cloud service to an existing terminal. However, the difference in service and the difference in time may not be addressed for Internet services.

For example, if a first device uses a first Internet browser to find a document, a second device using a second Internet browser may not use the document. Further, if a first device searches to find a document to use (e.g., a movie review, a book review, a web map, and the like), and seeks to use the same document on a second device, the second device may search for the respective document again on the second device to use. More specifically, uninterrupted use of a document may be limited in a conventional cloud service due to the difference in service, and the difference in time.

The above information disclosed in this Background section is provided for enhancement of understanding of the background of the invention and therefore it may contain information that does not form any part of the prior art nor what the prior art may suggest to a person of ordinary skill in the art.

SUMMARY

Exemplary embodiments of the present invention provide a system and method for linking documents using a cloud infrastructure.

Additional features of the invention will be set forth in the description which follows, and in part will be apparent from the description, or may be learned by practice of the invention.

An exemplary embodiment of the present invention provides a cloud-based document link system, including a storage unit configured to store, on a cross-clipboard, at least one first document associated with a first service provided through a first device; an identification unit configured to identify at least one second service linkable with each first document based on whether the at least one second service is configured to paste the at least one first document stored on the cross-clipboard; and a providing unit configured to provide a list of each second service if the cross-clipboard is accessed through a second device, in which, the providing unit is configured to provide a second document in response to a selection of the at least one second service, the second document associated with the at least one second service by being linked to the at least one second service.

Another exemplary embodiment of the present invention provides a method that uses a processor to provide a cloud-based document link method, the method including storing, on a cross-clipboard, at least one first document associated with a first service provided through a first device; identifying, by the processor, at least one second service linkable with each first document based on whether the at least one second service is capable of pasting the at least one first document stored on the cross-clipboard; providing, for a second device, a list of each second service if the cross-clipboard is accessed through the second device, and providing a second document in response to a selection of the at least one second service, the second document is associated with the at least one second service by being linked to the at least one second service.

An exemplary embodiment of the present invention provides a non-transitory computer-readable recording medium including an executable program, which when executed performs a method for controlling a cloud-based document link, the method includes storing, on a cross-clipboard, at least one first document associated with a first service provided through a first device; identifying at least one second service linkable with each first document based on whether the at least one second service is capable of pasting the at least one first document stored on the cross-clipboard; providing, for a second device, a list of each second service if the cross-clipboard is accessed through the second device; and providing a second document in response to a selection of the at least one second service, the second document associated with the at least one second service by being linked to the at least one second service.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 3, FIG. 4 and FIG. 5 are diagrams illustrating a process of storing, on a cross-clipboard, a document utilized according to an exemplary embodiment of the present invention.

FIG. 6A, FIG. 6B, FIG. 7A, FIG. 7B, FIG. 7C, FIG. 8A, FIG. 8B, and FIG. 8C are diagrams illustrating a process of providing a service linkable to a document stored on a cross-clipboard according to an exemplary embodiment of the present invention.

DETAILED DESCRIPTION OF THE ILLUSTRATED EMBODIMENTS

Figure 1:
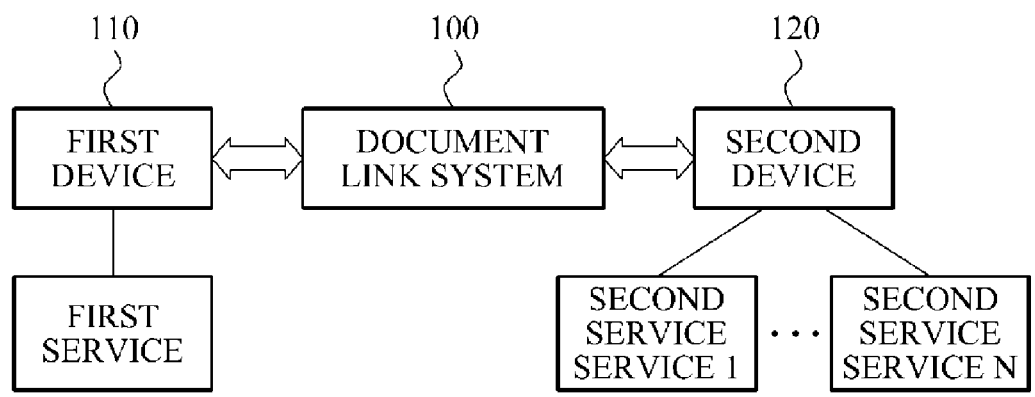
FIG. 1 is a block diagram illustrating a document link system that connects a service to a cloud infrastructure according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Like reference numerals in the drawings denote like elements.

It will be understood that when an element is referred to as being "connected to" another element, it can be directly connected to the other element, or intervening elements may is be present. In contrast, when an element is referred to as being "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a block diagram illustrating a document link system 100 that connects a service to a cloud infrastructure according to an exemplary embodiment of the present invention.

According to exemplary embodiments of the present invention, it may be possible to provide a cloud computing environment that may share related or the same information through various communication devices via Internet. Further, exemplary embodiments of the present invention may provide a more expansive copy and paste operation with respect to a cloud infrastructure. More specifically, the cross-copy and paste operation may be similar to a clipboard function implemented in an operating system (OS) of a single stand-alone computer, but is more expansive in that cross-copy and paste operation may be used across multiple devices. That is, according to exemplary embodiments of the present invention, the cross-copy and paste operation may use a cross-clipboard function (hereinafter, referred to as a cross-clipboard) for temporarily storing or recording information between cross-platforms and cross-media. The document link system 100 may use the cross-clipboard as an application programming interface (API) to use an internal service or to provide information to a public audience.

If a user accesses an Internet service (hereinafter, referred to as a first service) through a communication device (hereinafter, referred to as a first device) 110, uses or views a document (i.e., a web article) provided by the first service (hereinafter, referred to as a first document), and requests the first document be copied by using the cross-clipboard, the document link system 100 may copy at least a portion of the first document in the first service provided is through the first device 110, and store the first document copied by the cross-clipboard in a cloud environment.

Further, if the first document is copied by the cross-clipboard, the document link system 100 may identify, from the copied first document, a service that may be different from the first service and linkable to the first document (hereinafter, referred to a second service). The document link system 100 may maintain a list of the identified services or the second services. Thereafter, if the user accesses the cross-clipboard at a different time or a different space through a second device 120, the document link system 100 may provide a list of the first documents stored on the cross-clipboard. Further, the document link system 100 may provide the second device 120 with a list of the second services linkable with the first document.

Referring to FIG. 1, the first device 110 and the second device 120 may refer to a communication device that may access the Internet, such as a personal computer (PC), a mobile phone, a tablet computer, a laptop computer, a television (TV), and the like. Further, the second device 120 may refer to a communication terminal that is similar to or different from the first device 110. In an example, the first device 110 and the second device 120 may be considered similar if they belong to the same categorization of equipment (e.g., mobile phones, personal computers, and the like) or have similar operating systems. The first service and the second service may refer to an Internet-based service that may provide information on the Internet in various forms. Further, the second service may refer to an Internet service (e.g., a service 1, . . . , a service N of FIG. 1) that may provide information associated with the first document stored on the cross-clipboard. Also, the second service may refer to a service that is similar to or different from the first service. A document (e.g., the first document and the second document) may correspond to a piece of systematic information or content generated by a reference application program, and may refer to an object provided to a communication terminal through an Internet service via a network connection. For example, a news article accessed by a website using a PC, a search for a music by executing a reference application using a smart phone, and a show program displayed on TV may correspond to a document.

The document link system 100 may support use of information stored on the cross-clipboard through various communication devices. Further, the document link system 100 may support a connection of the second service having a different form from the first document to connect between different services. While a conventional system may provide an m:n conversion environment between a communication device and a communication device used for information by the user, the document link system 100 may provide a 1:m conversion environment between a communication device and a cross-clipboard by implementing the cross-clipboard operation based on a cloud environment. Thus, the document link system 100 may use the cross-clipboard in a cloud environment to provide an asymmetric interface, and to provide an environment in which various forms of information may be used through use of a single source.

Figure 2:
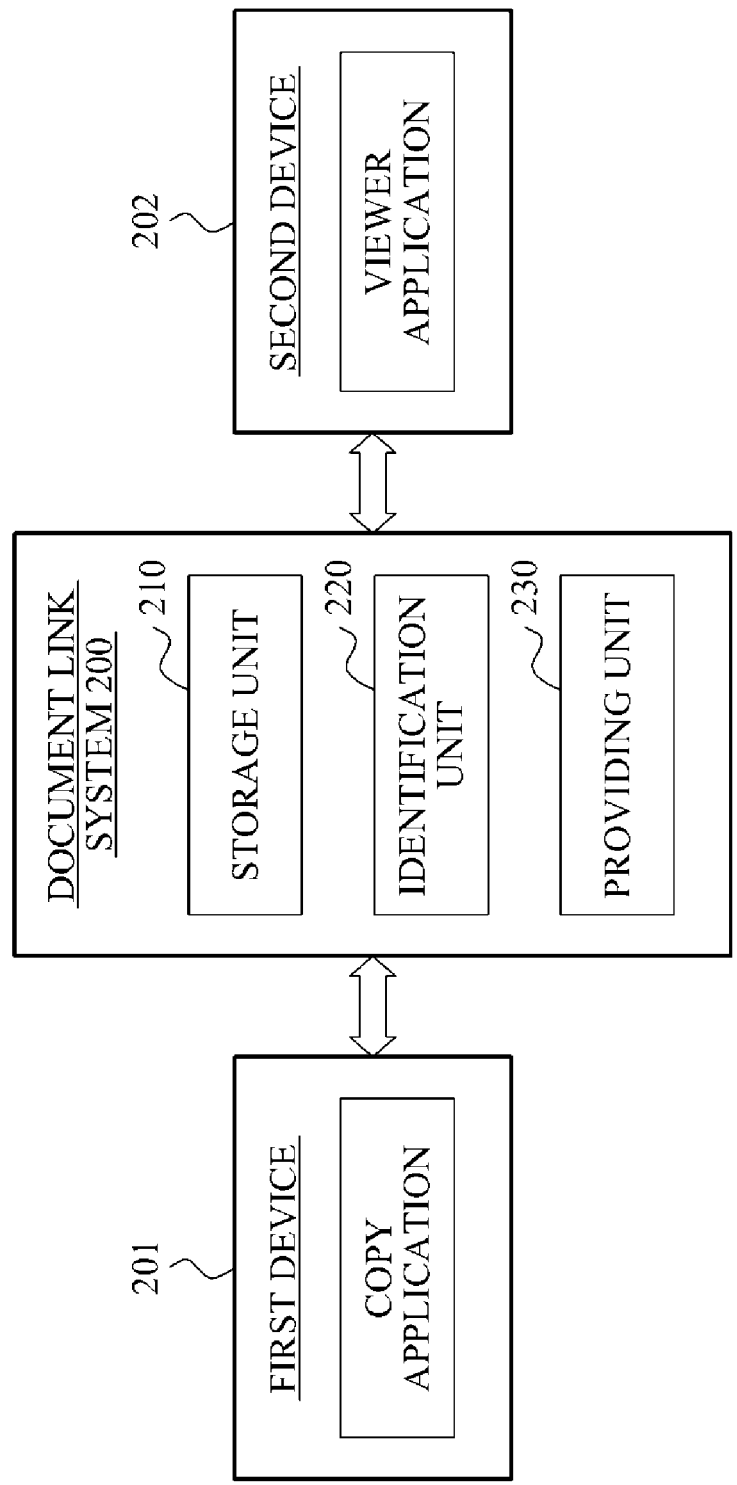
FIG. 2 is a diagram illustrating an internal configuration of a cloud-based document link system according to an exemplary embodiment of the present invention.

FIG. 2 is a diagram illustrating an internal configuration of a cloud-based document link system 200 according to an exemplary embodiment of the present invention.

Referring to FIG. 2, the cloud-based document link system 200 includes a storage unit 210, an identification unit 220, and a providing unit 230.

The storage unit 210 may temporarily store and record a document requested to be copied. More specifically, the storage unit 210 may store, on a cross-clipboard, a first document associated with a first service that is provided through a first device 201 if the first document is requested to be copied onto the cross-clipboard. The storage unit 210 may store and maintain at least one document copied onto the cross-clipboard.

For example, a copy application that may provide an interface with the storage unit 210 may be installed in the first device 201. In this example, the copy application may include a function of copying the first document in the first device 201, and transmitting the copied first document to the storage unit 210 if a request for a copy may be inputted by the user. As an example, if a user inputs a request for a copy of the first document while the user is using the first document on the first service through the first device 201 having the copy application, the copy application may perform an operation of copying the first document which may be delivered to the storage unit 210. More specifically, through the copy application in the first device 201, the storage unit 210 may receive the first document of which a copy may be requested by the user and the first document may be copied onto the cross-clipboard to store the received first document.

As another example, if a request for a copy is inputted by the user, the copy application may not copy the first document in the first device 201, and may deliver, to the storage unit 210, the request for a copy from the user. The storage unit 210 may copy the first document provided to the first device 201 according to the request for a copy received from the copy application. More specifically, the storage unit 210 may copy the first document provided to the first device 201 at a point in time when a copy may be requested in conjunction with a database system or a server managing the first service. In an example, if storing the first document on the cross-clipboard, the storage unit 210 may store the first document in a document form (e.g., a hypertext markup language (HTML) format) provided in the first service, or may store the first document in an application format (e.g., Notepad, Microsoft (MS) Word, MS Excel, and the like) for word processing. Further, the storage unit 210 may store the first document on the cross-clipboard along with additional data, such as a document type, a source, and a storage time of the first document.

In an example, the storage time of the first document may refer to a time at which the first document is copied in the first device, or a time at which the first document is stored on the cross-clipboard. The source of the first document may include at least one of a source indicating the first device that requests a copy of the first document and a source indicating the first service that provides the first document.

Figure 4:
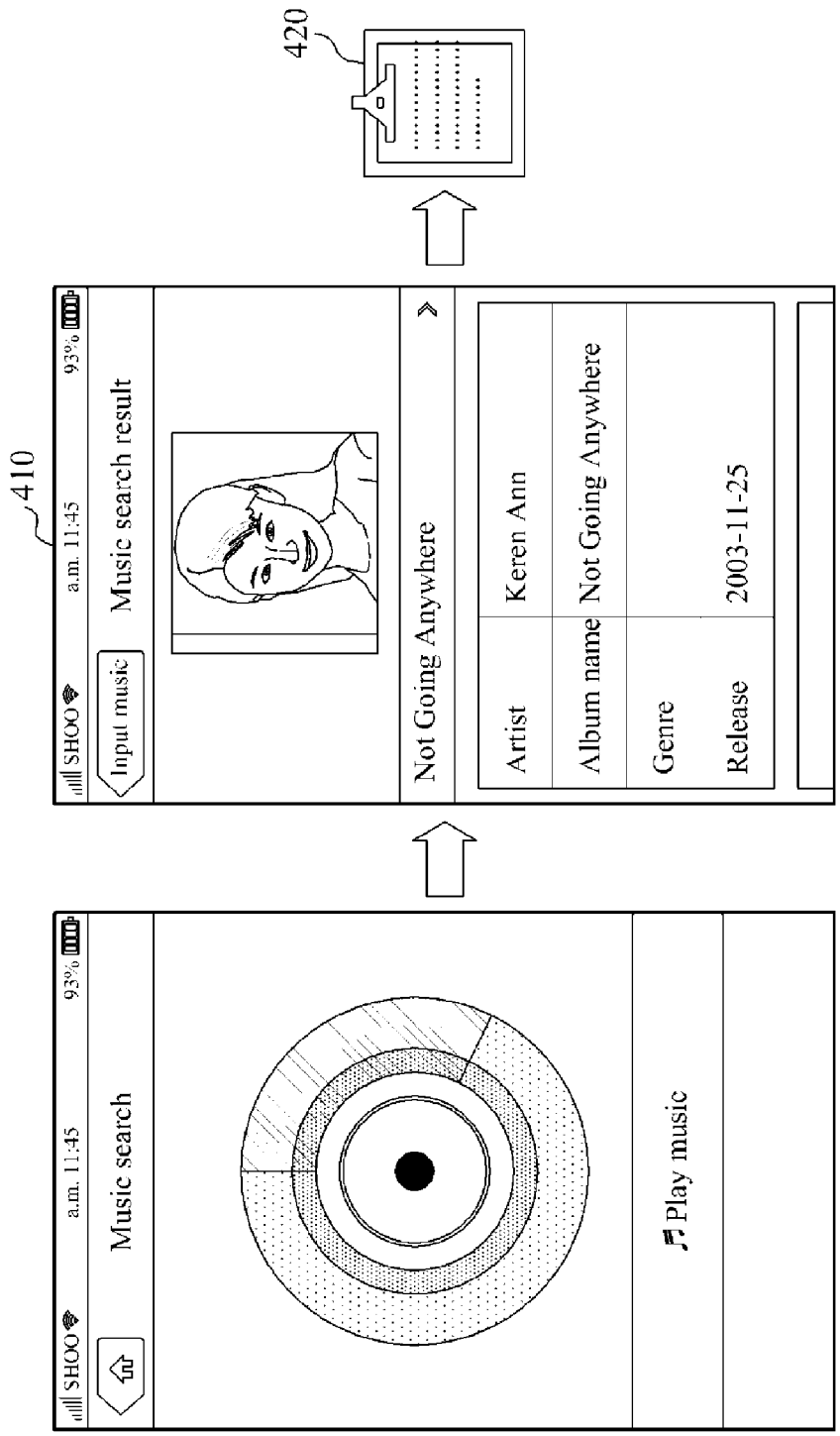
Figure 5:
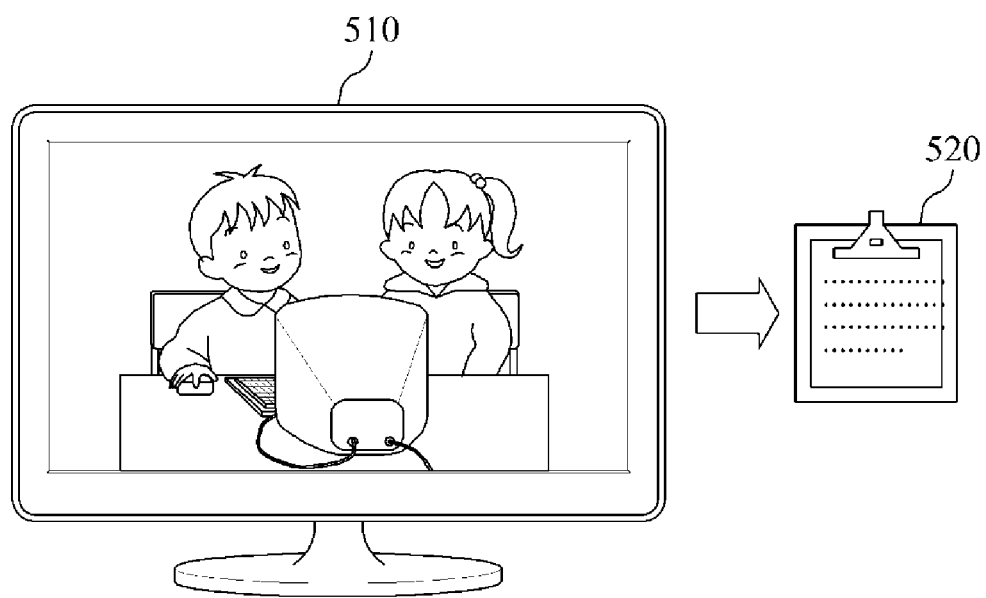

FIG. 3, FIG. 4, and FIG. 5 are diagrams illustrating a process of storing, on a cross-clipboard, a document utilized according to an exemplary embodiment of the present invention.

Referring to FIG. 3, if a user accesses a news website via a PC, and requests a copy of an article 310 provided from the news website, the storage unit 210 of FIG. 2 may store, on a cross-clipboard 320, the article 310 requested to be copied by the user. In this instance, the storage unit 210 may record 'text' as a type of a document stored on the cross-clipboard 320, and record, as a source of a document, at least one of a PC used to request a copy and a website providing the article 310.

Referring to FIG. 4, if a user searches for music in a mobile-dedicated application that provides a music searching service and requests a copy of music information 410 searched for, the storage unit 210 may store, on a cross-clipboard 420, the music information 410 requested to be copied by the user. In an example, the storage unit 210 may record 'music' as a type of a document stored on the cross-clipboard 420, and record, as a source of a document, at least one of a mobile device that requests a copy and application information that provide the music information 410.

Referring to FIG. 5, if a user requests a copy of a program 510 the user is viewing is via an Internet TV, the storage unit 210 may store, on a cross-clipboard 520, the program 510 which the user requests to be copied. In this instance, the storage unit 210 may record 'tv on air' as a type of a document stored on the cross-clipboard 520, and record, as a source of a document, at least one of an Internet TV terminal requesting a copy and a broadcasting company that provides the drama 510.

The identification unit 220 of FIG. 2 may identify at least one second service that may be linkable with the first document stored on the cross-clipboard. The identification unit 220 may identify the second service capable of pasting and processing the first document stored on the cross-clipboard. To this end, the identification unit 220 may include a service management module that initially receives a registration of services participating in the cross-clipboard, and manages the services. More specifically, the service management module may register and maintain services that request registration on the cross-clipboard. A service participating in the cross-clipboard may disclose an API including a function of registering, in the cloud-based document link system 200, an indication that the service may be pasted on the cross-clipboard, and a function of verifying whether a reference value is to be pasted if the reference value is stored on the cross-clipboard, and providing a result of verification to the cloud-based document link system 200.

The identification unit 220 may automatically receive verification as to whether a description, stored on the cross-clipboard is to be processed from one or more services by requesting services capable of pasting the description (i.e., service registered on the cross-clipboard). The identification unit 220 may automatically receive such verification when copying may be performed on the cross-clipboard. For example, the identification unit 220 may request, verification for whether the first document stored on the cross-clipboard is to be is processed by an internal service and an external service using a service link server (not shown). The service link server may connect the internal service and the external service.

The internal service may refer to an Internet service of a corresponding company managed by a server associated with the cloud-based document link system 200. The external service may refer to an Internet service of another company not directly managed by the server associated with the cloud-based document link system 200. In response, it may be determined, based on the first document stored on the cross-clipboard, that a service participating in the cross-clipboard (i.e., the second service) may paste the first document if a document corresponding to the first document (i.e., the second document) is included in the second service, and the corresponding result may be delivered to the identification unit 220.

For example, it may be determined that the second service may paste the first document if the second document having a keyword or link information is included in the second service after extracting the keyword or the link information from the first document. In an example, the identification unit 220 may reply to the identification unit 220 with a response indicating that the second service is capable of pasting the first document, and link information of the second document corresponding to the first document. In response, the identification unit 220 may identify, as the second service linkable with the first document, services providing a response indicating that the services are capable of processing the first document stored on the cross-clipboard. The storage unit 210 may store and maintain, for the first document stored on the cross-clipboard, a list of second services identified to be linkable with the first document in the identification unit 220, and link information of the second document corresponding to the first document for one or more second services.

FIG. 6A, FIG. 6B, FIG. 7A, FIG. 7B, FIG. 7C, FIG. 8A, FIG. 8B, and FIG. 8C is are diagrams illustrating services linkable with a document stored on the cross-clipboard.

Figure 6A:
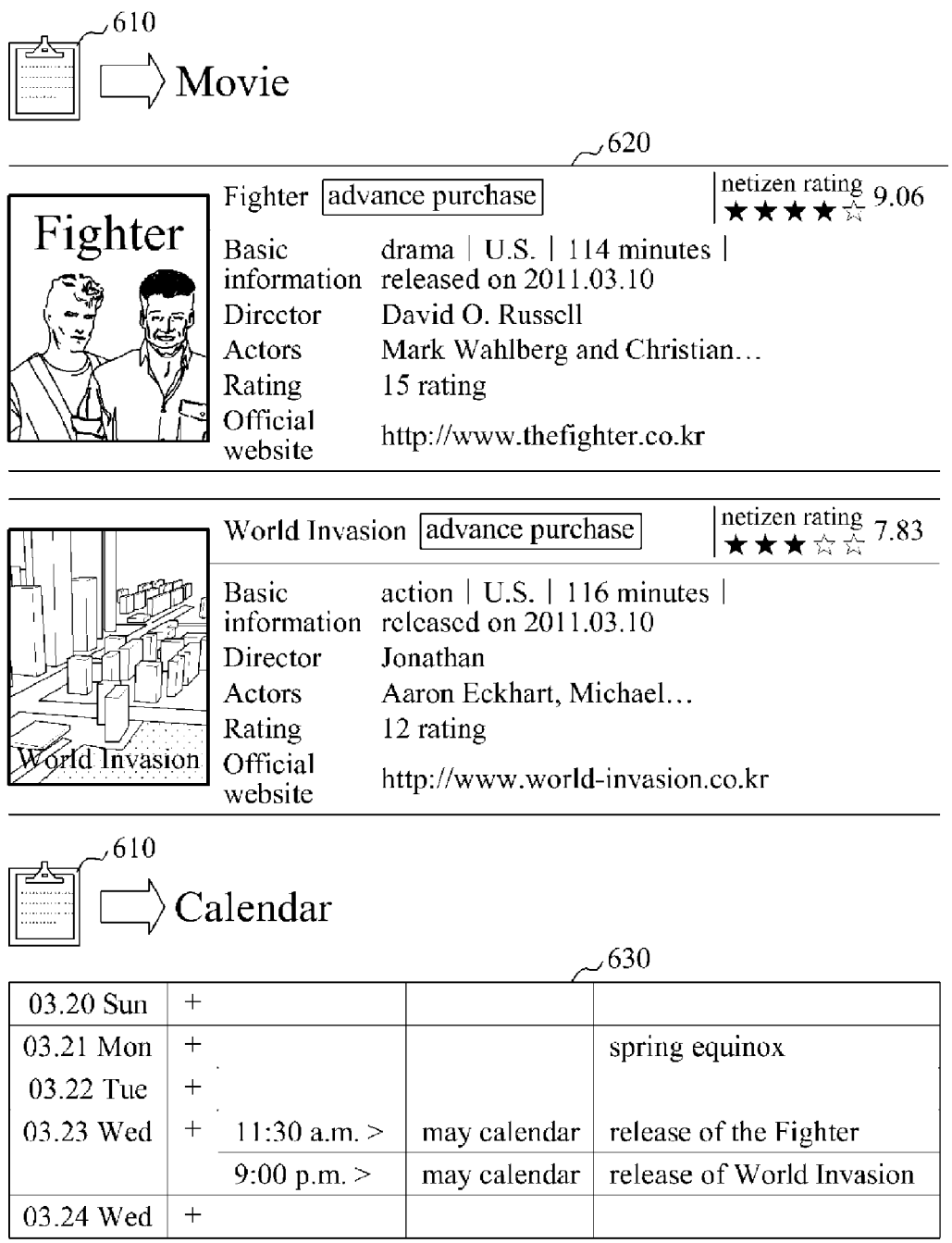

If the first document corresponds to a document associated with a movie, the identification unit 220 may identify at least one of a service providing detailed information associated with the movie, a service providing a community associated with the movie or a user, a service for purchasing or advance purchasing of tickets for the movie, a service providing music information associated with the movie, a service managing a schedule associated with the movie, a service providing character information associated with the movie, and the like. For example, if a document stored on the cross-clipboard corresponds to an article on the Internet associated with a reference movie as illustrated in FIG. 3, or if a main keyword of the corresponding article is associated with the reference movie, the identification unit 220 may identify a movie service 620 providing detailed information of a movie included in a document 610 (e.g., a title, a genre, a director, a rating, actors, a netizen rating, a related picture, a related video, and the like), a calendar service 630 corresponding to a schedule manager that registers a schedule of a movie included in the document 610 in a user's scheduler that manages the user's schedule, a character search service 640 providing information about characters appearing in a movie included in the document 610, a music service 650 providing an original sound track (OST) of a movie included in the document 610, and the like as illustrated in FIG. 6A and FIG. 6B.

Figure 7A:
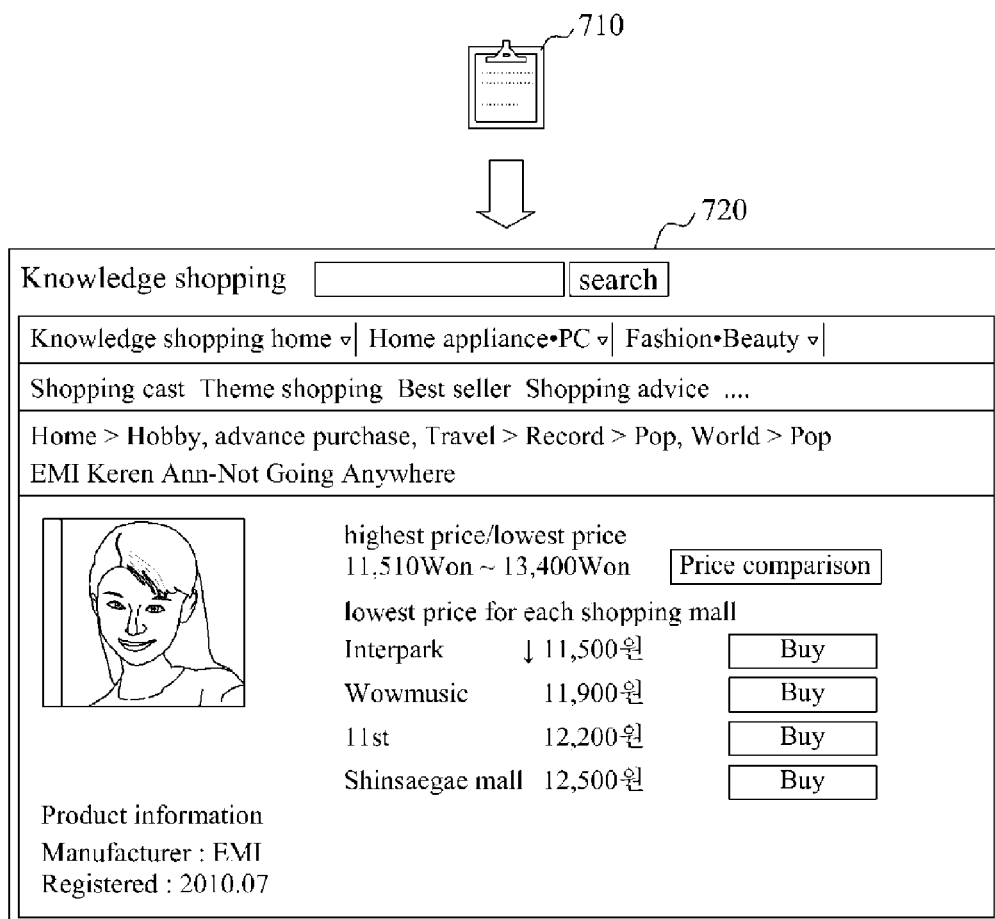
Figure 7B:
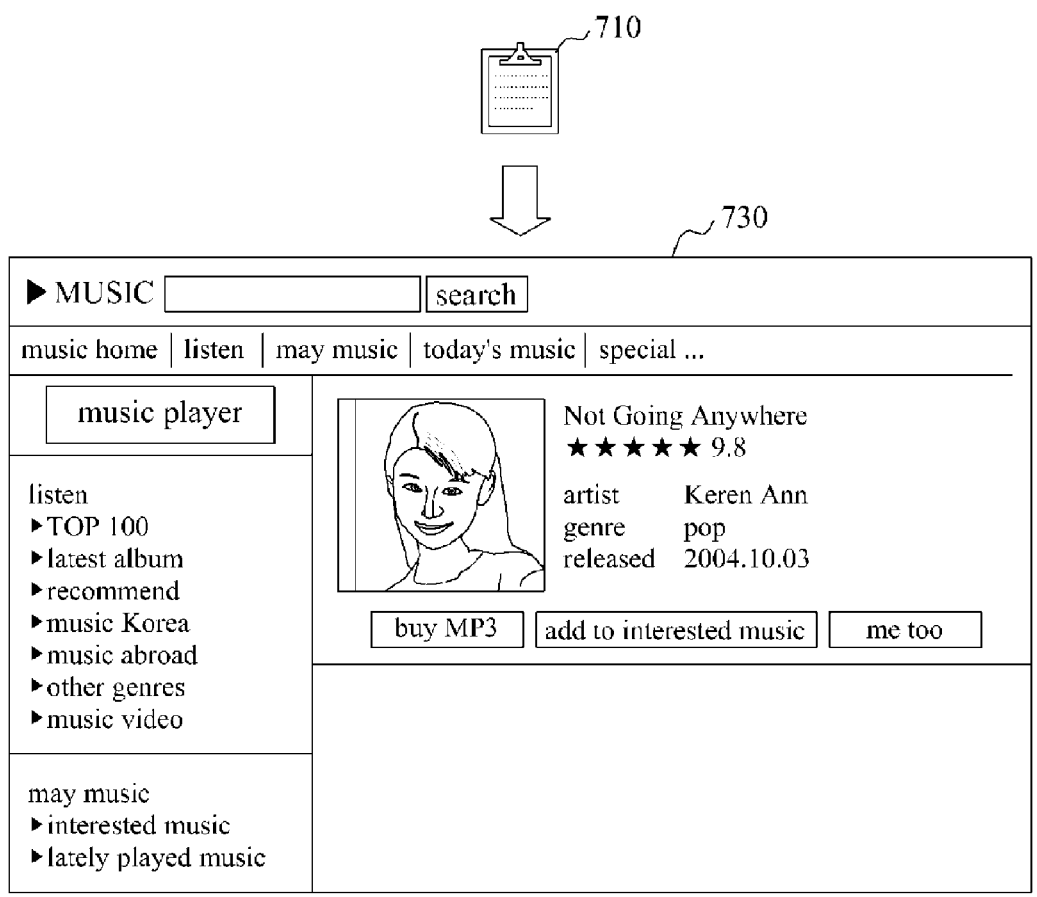
Figure 7C:
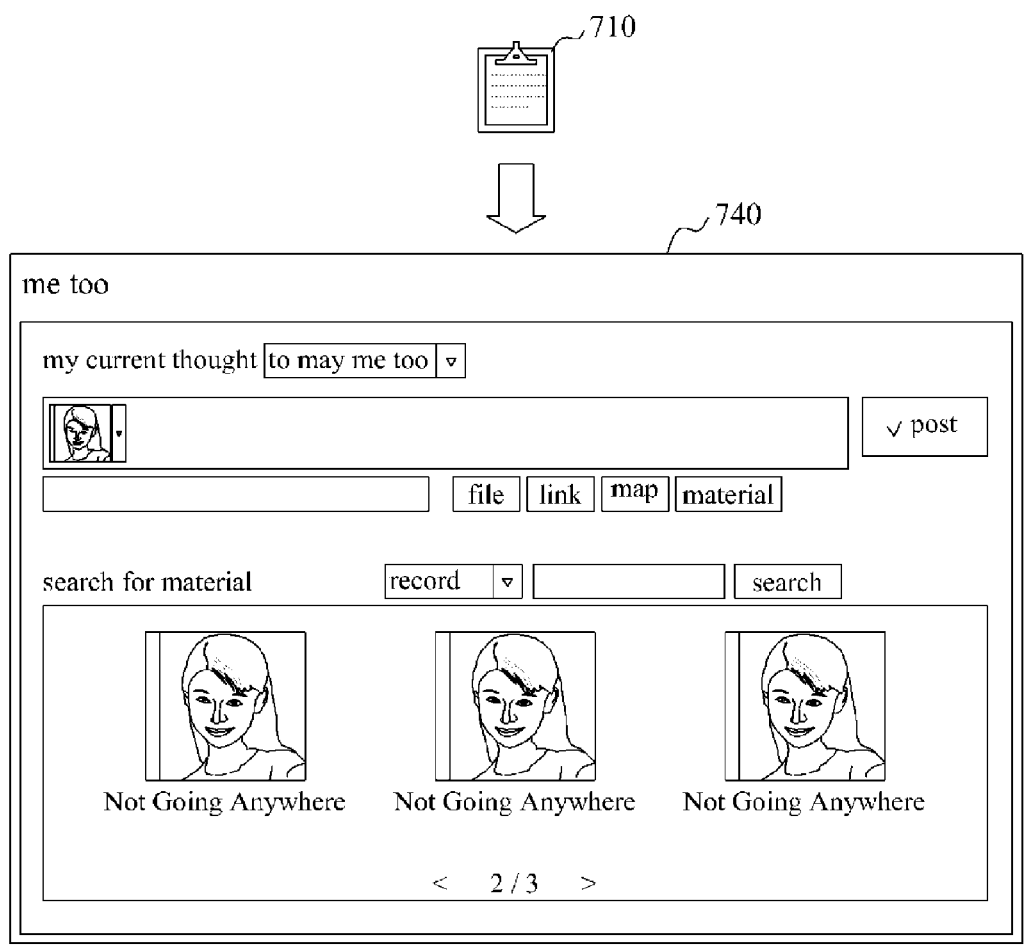

If the first document corresponds to a document associated with a song, the identification unit 220 may identify a service providing detailed information associated with the song, a service for purchasing the song or an album including the song, a service providing a community associated with the song or persons associated with the song, a service providing character information associated with the music, and the like. For example, if a document stored on the cross-clipboard is associated with a reference song as illustrated in FIG. 4, the identification unit 220 may identify at least one of a shopping service 720 providing or recommending a shopping website where the song associated with a document 710 may be purchased, a music service 730 providing detailed information of the song associated with the document 710 (e.g., a title, a genre, an artist, and the like), a community service 740 for posting a comment in which the music associated with the document 710 corresponds to a topic, and the like as illustrated in FIG. 7A, FIG. 7B, and FIG. 7C.

Figure 8A:
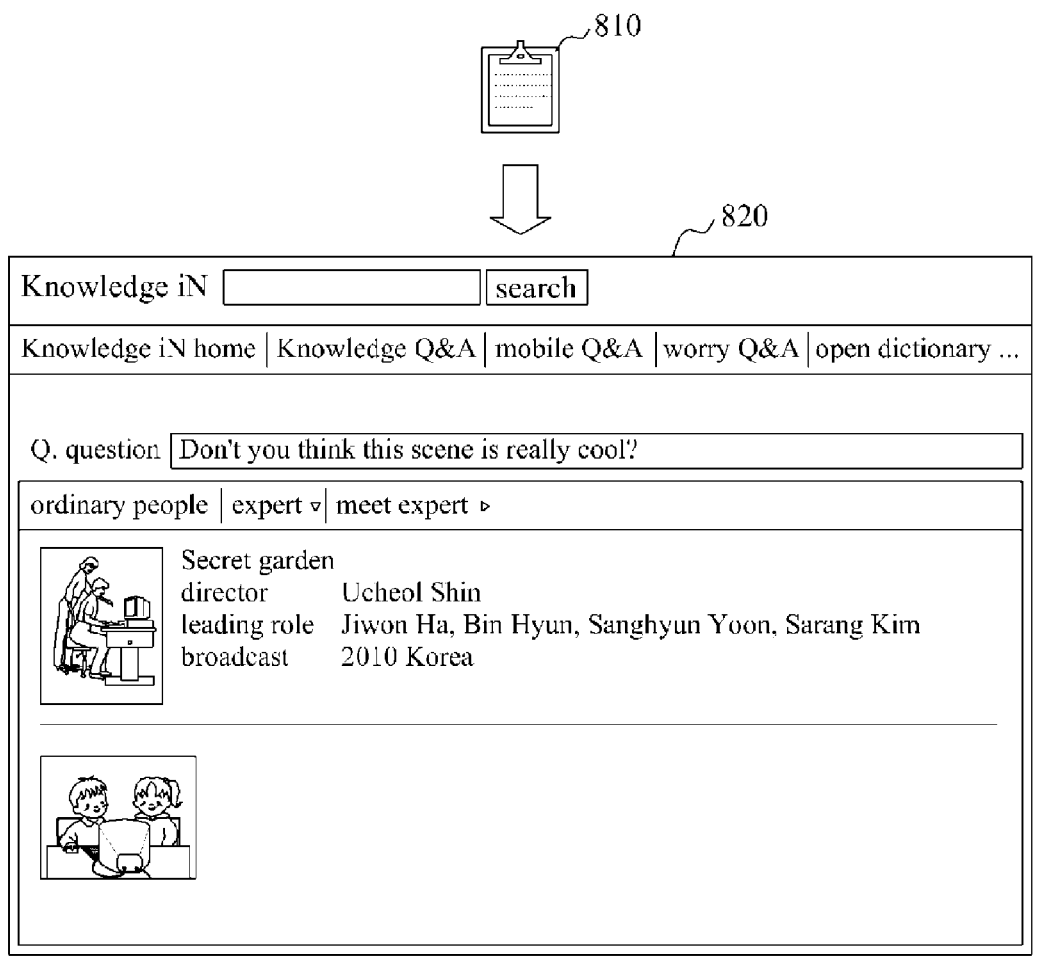
Figure 8B:
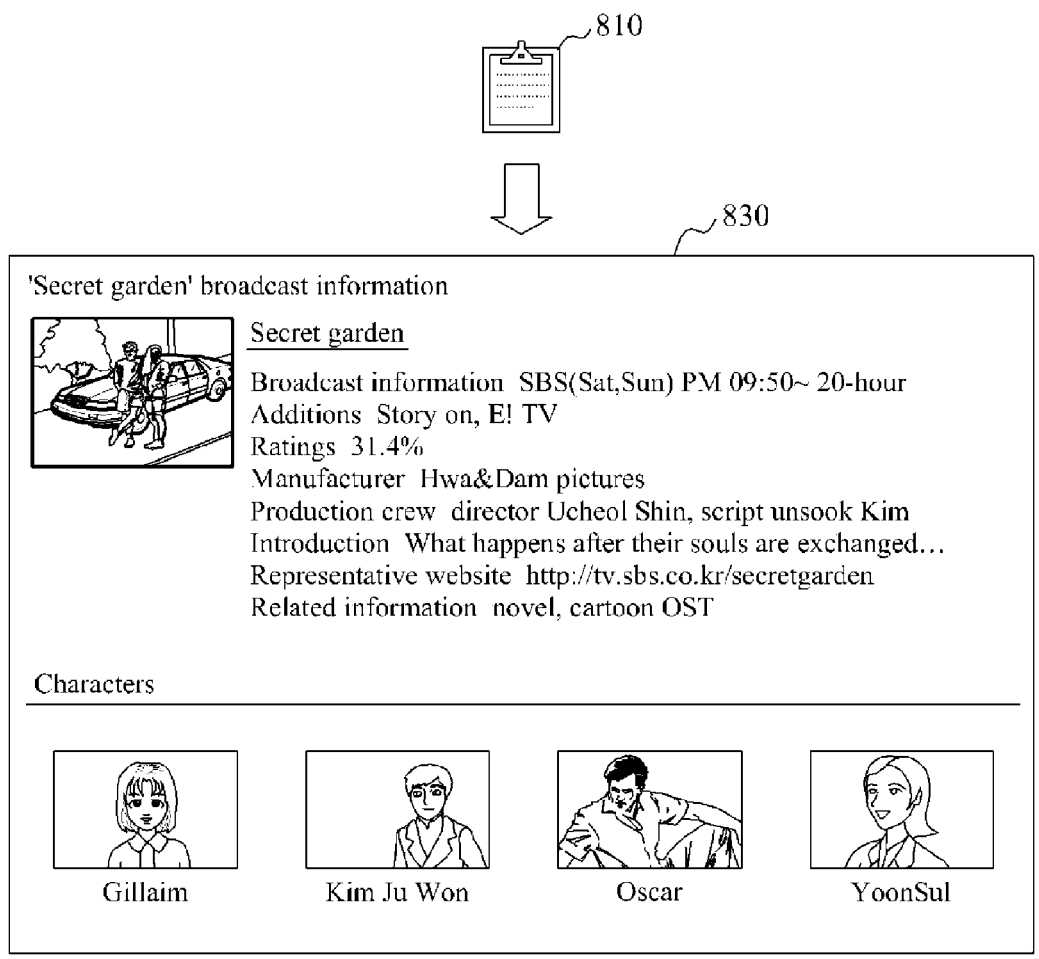
Figure 8C:
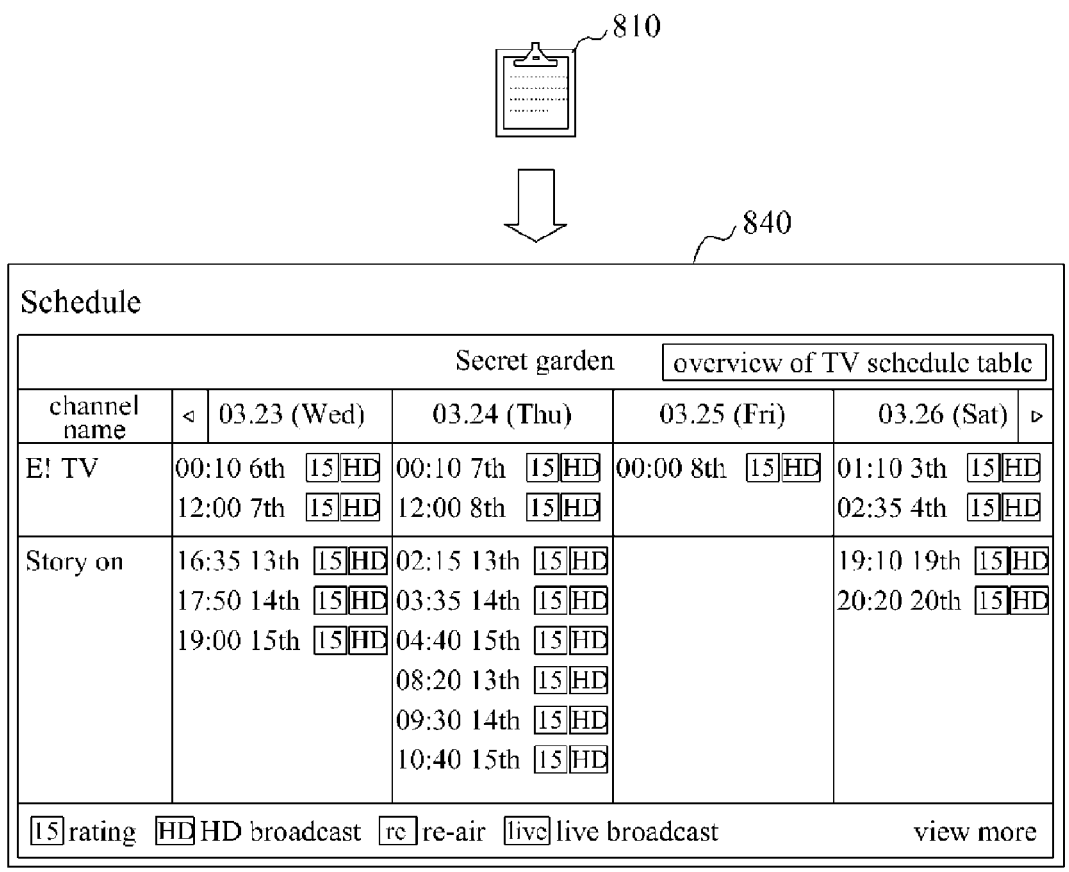

If the first document corresponds to a document associated with a broadcast program, the identification unit 220 may identify at least one of a service providing detailed information associated with the broadcast program, a service providing a schedule associated with the broadcast program, a service providing music information associated with the broadcast program, a service managing a schedule associated with the broadcast program, a service providing character information associated with the broadcast program, a service providing a community associated with the broadcast program or a user, and the like. For example, if a document stored on the cross-clipboard is associated with a reference broadcast program as illustrated in FIG. 5, the identification unit 220 may identify a community service 820 for posting a comment in which a broadcast program associated with a document 810 corresponds to a topic being discussed in the community service 820, a broadcast service 830 providing broadcast information of the broadcast program associated with the document 810 (e.g., a title, a broadcasting time, ratings, a management agency, a production crew, actors, and the like), a TV schedule service 840 providing schedule information of the broadcast program associated with the document 810, and the like as illustrated in FIG. 8A, FIG. 8B, and FIG. 8C.

If the first document corresponds to a document associated with a product, the is identification unit 220 may identify at least one of a service providing detailed information associated with the product, a service for purchasing the product, a service for managing a schedule associated with the product, and a service providing a community associated with the product or a user.

The providing unit 230 may provide at least one second service for the first document stored on the cross-clipboard if access to the cross-clipboard is requested through a second device 202 from the user. In this instance, the second device 202 may refer to a communication terminal that is similar to or different from the first device 201. In response to a user accessing the cross-clipboard through the second device 202, the providing unit 230 may initially provide, based on data stored in the storage unit 210, a list of the second services for one or more first documents, along with a list of the first document stored on the cross-clipboard. If a user selects one of the second services from the list of the second services, the providing unit 230 may provide the second device 202 with a second document provided by the selected second service. As an example, a user may request access to the cross-clipboard by accessing the providing unit 230 through the second device 202. In response, the providing unit 230 may output, on a screen, at least one of a list of the first documents, a list of the second service, and a second document provided in the second service in a view environment targeting the second device 202.

As another example, a viewer application providing an interface with the providing unit 230 may be installed in the second device 202. In this instance, the viewer application may include a function of delivering a request for access to the cross-clipboard in response to the request being input from a user to the providing unit 230, and a function of outputting, on a screen, at least one of the second document provided by the second service, the is list of the second service, and the list of the first document provided by the providing unit 230 based on an interface with the user.

Figure 9:
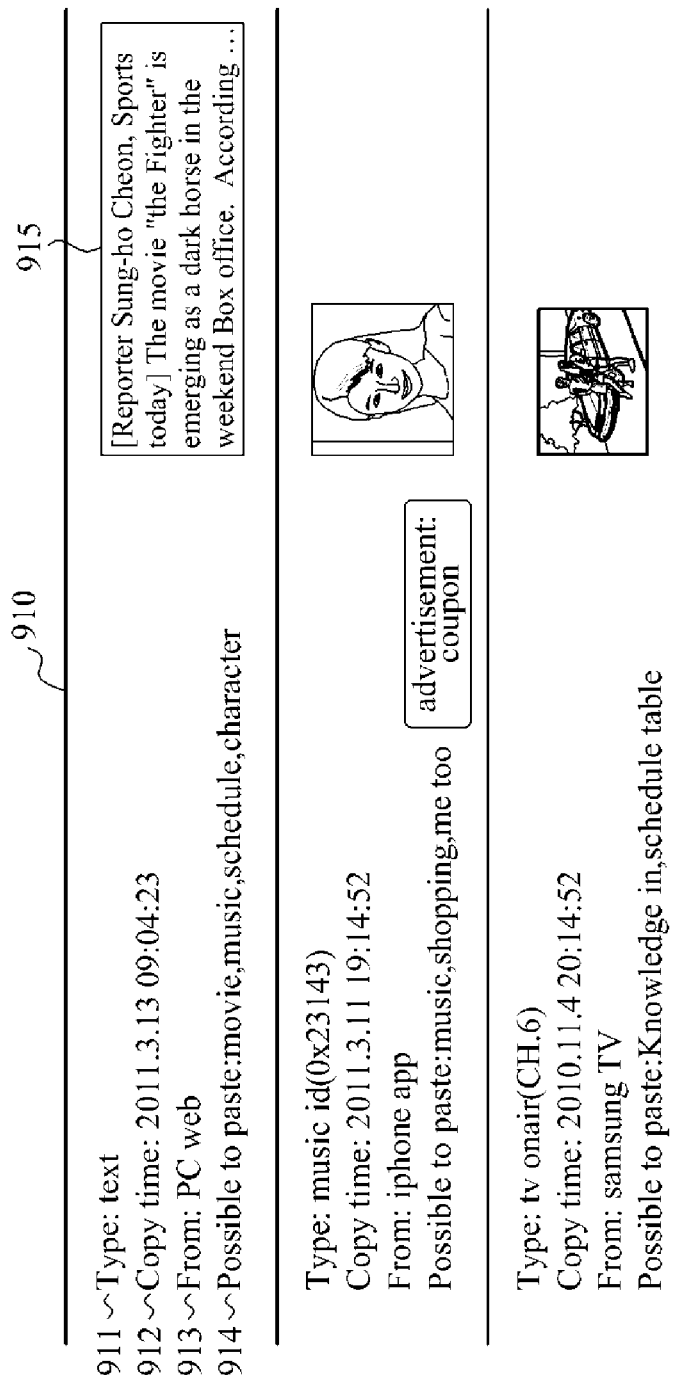
FIG. 9 is a diagram illustrating a viewer screen on which content stored on a cross-clipboard may be retrieved according to an exemplary embodiment of the present invention.

FIG. 9 is a diagram illustrating a viewer screen 910 provided to the second device 202, on which content stored on a cross-clipboard may be retrieved according to an exemplary embodiment of the present invention.

In response to a user requesting access to a cross-clipboard through the second device 202, the viewer screen 910 may be executed on the second device 202 as illustrated in FIG. 9. The first document stored on the cross-clipboard may be displayed on the viewer screen 910 by being aligned according to item types. Since at least one first document may be stored on the cross-clipboard, various schemes may be applied to an order of displaying items if displaying a list of the first documents in a viewer environment.

As an example, the providing unit 230 may align the first document stored on the cross-clipboard according to an order of a storage time included in additional data (i.e., copied time), and display the first document. As another example, the providing unit 230 may align the first document stored on the cross-clipboard in a descending or ascending order based on number of second services capable of pasting the first document, and display the first document. As still another example, the providing unit 230 may align the first document stored on the cross-clipboard according to a descending or ascending order based on popularity corresponding to copy requests from other users, and provide the first document based on a copied result by other users. As yet another example, the providing unit 230 may align the first document stored on the cross-clipboard according to a document type or a source, and display the first document.

Referring to FIG. 9, a document type 911, a storage time 912, and a source 913 corresponding to additional data associated with the first document may be displayed for one or is more items displayed on the viewer screen 910. Further, a thumbnail 915 for the first document may be displayed on the viewer screen 910 so that a user may recognize the first document corresponding to one or more items. Further, a list of second services 914 linkable with the first document may be provided to one or more items displayed on the viewer screen 910. In this instance, a hyperlink for connecting each service may be activated and displayed in the list of the second service 914. The hyperlink displayed in a list of the second service 914 may be set to link information of the second document matching the first document stored for one or more second services. More specifically, a user may retrieve the first document stored on the cross-clipboard on the viewer screen 910 through the second device 202, and the second service associated with the first document. In response to a user selecting a reference service from the list of the second services 914, the selected second service may be linked for enabling the user to utilize the second document provided in the second service.

Figure 10:
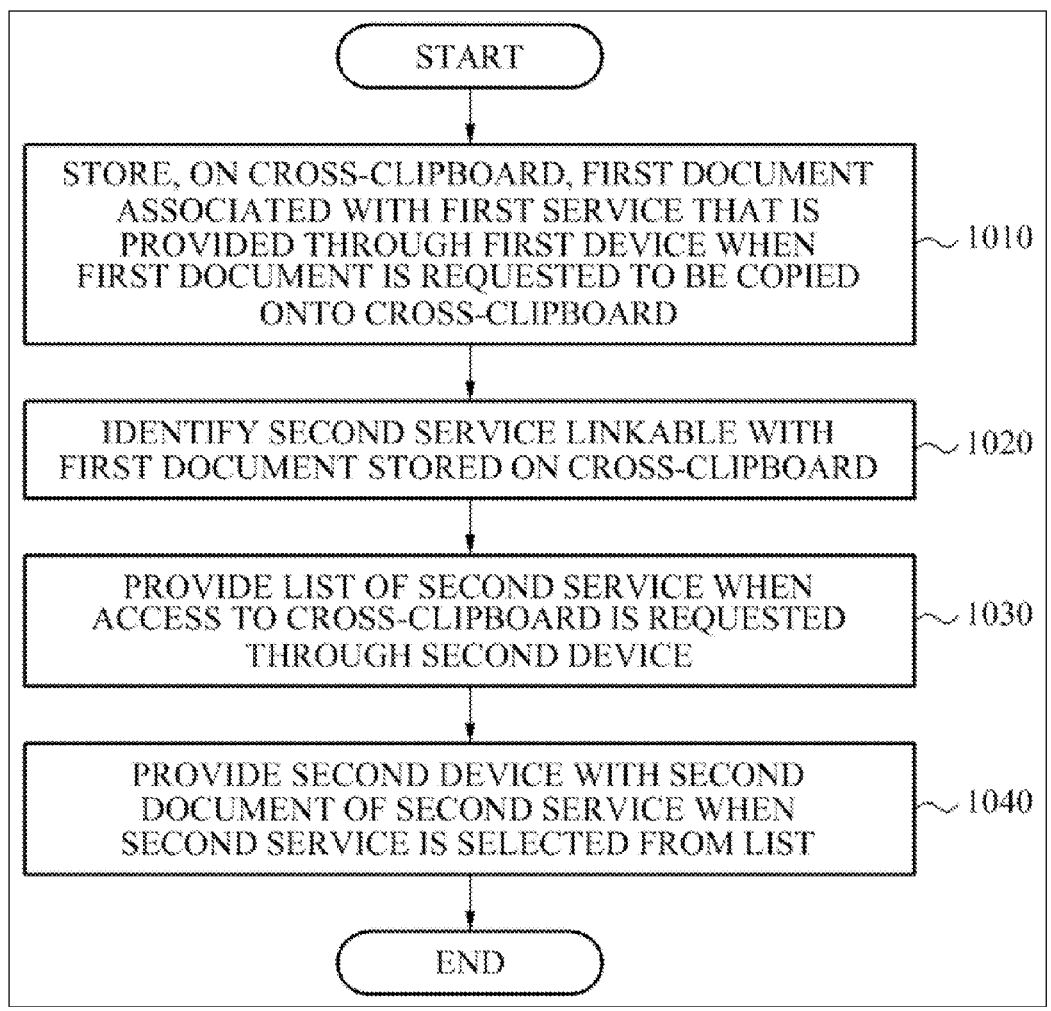
FIG. 10 is a flowchart illustrating a document link method according to an exemplary embodiment of the present invention.

FIG. 10 is a flowchart illustrating a document link method according to an exemplary embodiment of the present invention. The document link method of FIG. 10 may be performed by the cloud-based document link system 200 of FIG. 2 and will be described as such, but the described method is not limited thereto.

In operation 1010, the cloud-based document link system 200 may store, on a cross-clipboard, a first document associated with a first service that may be provided through a first device if the first document is requested to be copied onto the cross-clipboard. In this instance, a copy application executed in conjunction with the cloud-based document link system 200 may be installed in the first device. As an example, in response to a copy request inputted by a user, the copy application may deliver the copy request from the user to the cloud-based document link system 200, and the storage unit 210 may copy the first document provided to the is first device 201 in the first service at a point in time when the copy request occurs. The cloud-based document link system 200 may store additional data, such as a document type, a source, a storage time, and the like of the first document if storing the first document. In an example, the source of the first document may include at least one of a source indicating the first device requesting a copy of the first document, and a source indicating the first service providing the first document.

In operation 1020, the cloud-based document link system 200 may identify at least one second service linkable with the first document stored on the cross-clipboard. The cloud-based document link system 200 may receive verification as to whether a description, automatically stored on the cross-clipboard if a copy operation is performed on the cross-clipboard, is to be processed from one or more services by requesting services capable of pasting the description. More specifically, the cloud-based document link system 200 may receive a registration of services participating in the cross-clipboard, and request the services participating in the cross-clipboard for whether the services may paste the first document if storing the first document on the cross-clipboard. In an example, a service participating in the cross-clipboard (i.e., the second service) may determine based on the first document stored on the cross-clipboard that the service may paste the first document if the second document corresponding to the first document is included. Further, the service may deliver the corresponding result to the cloud-based document link system 200. The corresponding result delivered from the second service may include link information for the second document matching the first document.

In operation 1030, the cloud-based document link system 200 may provide the second service for the first document stored on the cross-clipboard if access to the cross-clipboard is requested through a second device. In response to a user accessing the clipboard is through the second device, the cloud-based document link system 200 may initially provide a list of the second service for one or more first documents along with a list of the first documents stored on the cross-clipboard. In an example, a viewer application executed in conjunction with the cloud-based document link system 200 may be installed in the second device. In response to the user requesting access to the cross-clipboard through the second device, the viewer application may deliver the request to the document link system 200, and may output, on a screen, the list of the second services and the list of the first documents provided from the document link system 200 in response to the request for access.

The cloud-based document link system 200 may display or provide, for one or more items in the list of the first documents, a thumbnail for the first document in addition to additional data such as a document type, a storage time, and a source of the first document. The cloud-based document link system 200 may create a hyperlink on one or more items in the list of the first service to be linked to the second service. In an example, the hyperlink may be set to link information of the second document corresponding to the first document. The cloud-based document link system 200 may apply various standards if displaying the list of the first document stored on the cross-clipboard. More specifically, the cloud-based document link system 200 may align the first document stored on the cross-clipboard in a chronological order of being copied on the cross-clipboard, or align the first document in a descending or ascending order of a number of second services capable of pasting the first document. The cloud-based document link system 200 may align the first document stored on the cross-clipboard according to a descending or ascending order of popularity corresponding to copy requests from other users, or may classify the first document according to a type or a source of the first document, and display the first document.

In operation 1040, in response to the user selecting a reference service from a list of the second services, the cloud-based document link system 200 may provide the second device with the second document associated with the second service selected by the user. More specifically, in response to the user selecting a reference service from a list, the cloud-based document link system 200 may provide the second document in the second service through being linked with the selected second service. A hyperlink recorded in a list of the second services may be set to link information provided by the second service that is identified to be capable of pasting the first document. In response to the user selecting the second service from the corresponding list, a document of the selected second service (i.e., the second document corresponding to the first document) may be provided to the second device.

As described in the foregoing, by expanding a clipboard concept of copy and paste operation with respect to a cloud infrastructure, it may be possible to store, on a cross-clipboard and provide the document stored on the cross-clipboard through various devices at various times and locations. Further, it may be possible to link an advertisement associated with other types of services in relation with the document stored on the cross-clipboard. Thus, by applying a cloud-based cross-clipboard, it may be possible to resolve a difference in devices, times, and spaces, and a user may continue utilizing information in various environments.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the is computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, it may be possible to accommodate a difference in services, a difference in times, and a difference in devices by expanding, to a cloud infrastructure, a copy and paste concept generally implemented in a single device. Accordingly, information in a cross-clipboard may be maintained on a cloud, and utilization of information stored on the cross-clipboard may be supported at various times, devices and/or locations.

According to exemplary embodiments of the present invention, it may be possible to support a user continuously utilizing information on the Internet, through an environment that may connect services on the Internet, by automatically displaying various services linkable with a document stored on a cross-clipboard based on a cloud if retrieving the document.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their is equivalents.

What is claimed is:

1. A cloud-based document link system for enabling, via a cross-clipboard of a server, use of a search result of a first device by a second device, the system comprising:
   a storage included in the server, the storage configured to store a first document onto the cross-clipboard in the storage, the first document being multimedia-related content searched by a first service associated with the first device, the first device being separate from and connected to the server via internet; and
   at least one processor configured to execute computer-readable instructions with respect to the stored first document to,
      identify one or more second services linkable with the first document based on information within the first document,
      if a second device accesses the cross-clipboard, provide the second device with
         the first document stored at the cross-clipboard, and
         the one or more second services associated with the first document, each of the one or more second services configured to be linked to at least one second document, the at least one second document being at the server or at an external server connected to the server and matching the first document without switching to the cross-clipboard, the second device being separate from and connected to the server via the internet, and
      if the second device selects one second service from among the one or more second services, enable a user to utilize the at least one second document associated with the selected one second service, wherein the second service is different from the first service in terms of form of supporting documents, and the second document has a form different from that of the first document.

2. The cloud-based document link system of claim 1, wherein:
the storage is configured to store at least one of a document type, a source, and a storage time of the first document.

3. The cloud-based document link system of claim 1, wherein the second device comprises:
a communication terminal that is similar to or different from the first device.

4. The cloud-based document link system of claim 1; wherein the processor is further configured to,
register the one or more second services requested to be registered at the cross-clipboard, and
manage the one or more second services registered at the cross-clipboard.

5. The cloud-based document link system of claim 4, wherein the one or more second services comprise:
an application programming interface (API) module configured to,
register, in the processor, an indication that the one or more second services is a service configured to paste information stored at the cross-clipboard,
verify whether the one or more second services are configured to paste the first document, and
provide a result of the verification to the processor.

6. The cloud-based document link system of claim 1, wherein the selected one second service is configured to paste the first document when the at least one second document matching the first document is associated with the selected one second service.

7. The cloud-based document link system of claim 1, wherein the selected one second service is configured to paste the first document when the second document, having at least one of link information and a keyword extracted from the first document, is associated with the selected one second service.

8. The cloud-based document link system of claim 1, wherein:
the processor is further configured to create a hyperlink corresponding to each of the one or more second services, and
the hyperlink is configured to link information associated with the second document.

9. The cloud-based document link system of claim 1, wherein the at least one processor is further configured to:
provide a list of a set of first documents stored on the cross-clipboard in response to a request to access the cross-clipboard, the set of first documents including the first document, and
provide at least one of a document type, a source, and a storage time of each first document in the list, and the source including at least one of a source indicating the first device and a source indicating the first service.

10. The cloud-based document link system of claim 1, wherein the at least one processor is further configured to:
provide a list of a set of first documents stored on the cross-clipboard in response to a request to access the cross-clipboard, the set of first documents including the first document; and
provide a thumbnail of each first document in the list.

11. The cloud-based document link system of claim 1, wherein the processor is further configured to:
provide a list of first documents, the list including the first document, lists of the one or more second services corresponding to respective first documents; and
enable a viewer application installed in the selected one second device to display the first document from among the list of first documents, a list of the one or more second services corresponding to the first document, and the second document associated with one second device from among the list of the one or more second services.

12. A cloud-based document link method that allows, via a cross-clipboard of a server, using a search result of a first device by a second device, the method comprising:
storing, on a storage included in the server, a first document onto the cross-clipboard in the storage, the first document being multimedia-related content searched by a first service associated with the first device, the first device being separate from and connected to the server via internet;
identifying, by a processor, from among a set of second services, one or more second services linkable with the first document based on information within the first document;
in response to a second device accessing the cross-clipboard, providing, by the processor, the second device with
the first document stored at the cross-clipboard, and
the one or more second services associated with the first document, each of the one or more second services configured to be linked to at least one second document, the at least one second document being at the server or at an external server connected to the server and matching the first document without switching to the cross-clipboard, the second device being separate from and connected to the server via the internet; and
in response to the second device selecting one second service from among the one or more second services, enable a user to utilize the at least one second document associated with the selected one second service,
wherein the second service is different from the first service in terms of form of supporting documents, and the second document has a form different from that of the first document.

13. The cloud-based document link method of claim 12, wherein the storing further comprises:
storing at least one of a document type, a source, and a storage time of the first document.

14. The cloud-based document link method of claim 12, wherein the second device corresponds to a communication terminal that is similar to or different from the first device.

15. The cloud-based document link method of claim 12, wherein the identifying comprises:
registering the one or more second services requested to be registered at the cross-clipboard, and
managing the one or more second service registered at the cross-clipboard.

16. The cloud-based document link method of claim 15, wherein the registering the one or more second service comprise:
registering an indication that the one or more second services is a service capable of pasting information stored on the cross-clipboard;
verifying whether the one or more second services are capable of pasting the first document; and
providing a result of the verification.

17. The cloud-based document link method of claim 12, wherein the providing the second device includes determining the one or more second services, each of which is capable of pasting the first document when the at least one second document matching the first document is associated with a selected one of the one or more second services.

18. The cloud-based document link method of claim 12, wherein the providing the second device includes determining the one or more second services, each of which is capable of pasting the first document when the at least one second document, having at least one of link information and a keyword extracted from the first document, is associated with a selected one of the one or more second services.

19. The cloud-based document link method of claim 17, wherein when the providing the second device further comprises enabling each of the one or more second services to be provided with link information of the second document.

20. The cloud-based document link method of claim 12, wherein the providing the one or more second services comprise:
   creating a hyperlink corresponding to each of the one or more second services; and
   linking information associated with the second document using the hyperlink.

21. The cloud-based document link method of claim 12, wherein the providing comprises:
   providing a list of first documents stored on the cross-clipboard in response to a request for access to the cross-clipboard, the list of the first documents including the first document; and
   providing at least one of a document type, a source, and a storage time of each first document in the list, the source being information of the first service associated to the each first document.

22. The cloud-based document link method of claim 12, wherein the providing comprises:
   providing a list of first documents stored on the cross-clipboard in response to a request for access to the cross-clipboard, the list of the first documents including the first document; and
   providing a thumbnail of each first document in the list.

23. The cloud-based document link method of claim 12, further comprising:
   providing a list of first documents, the list including the first document, lists of the one or more second services corresponding to respective first documents; and
   outputting, to a screen, the first document from among the list of first documents, one of the lists of the one or more second services corresponding to the first document, and the second document associated with one second device from among the one of the lists of one or more second services.

24. A non-transitory computer-readable recording medium comprising an executable program, which when executed by a processor included in a server, configures the processor to:
   store, on a storage included in the server, a first document onto a cross-clipboard in the storage, the first document being multimedia-related content searched by a first service associated with a first device, the first device being separate from and connected to the server via internet;
   identify, from among a set of second services, one or more second services linkable with the first document based on information within the first document;
   if a second device accesses the cross-clipboard, provide the second device with
      the first document stored at the cross-clipboard, and
      the one or more second services associated with the first document, each of the one or more second services configured to be linked to at least one second document, the at least one second document being at the server or at an external server connected to the server and matching the first document, without switching to the cross-clipboard; and
   if the second device selects one second service from among the one or more second services, enable a user to utilize the at least one second document associated with the selected one second service,
   wherein the second service is different from the first service in terms of form of supporting documents, and the second document has a form different from that of the first document.

* * * * *